Sept. 25, 1923.

E. SCOTT 1,468,749

CENTRIFUGAL APPARATUS FOR MANUFACTURING CONCRETE PIPES AND LIKE TUBULAR STRUCTURES

Filed Sept. 11, 1922   3 Sheets-Sheet 1

Inventor:
Ernest Scott,
by Emil Bonnelycke
Attorney

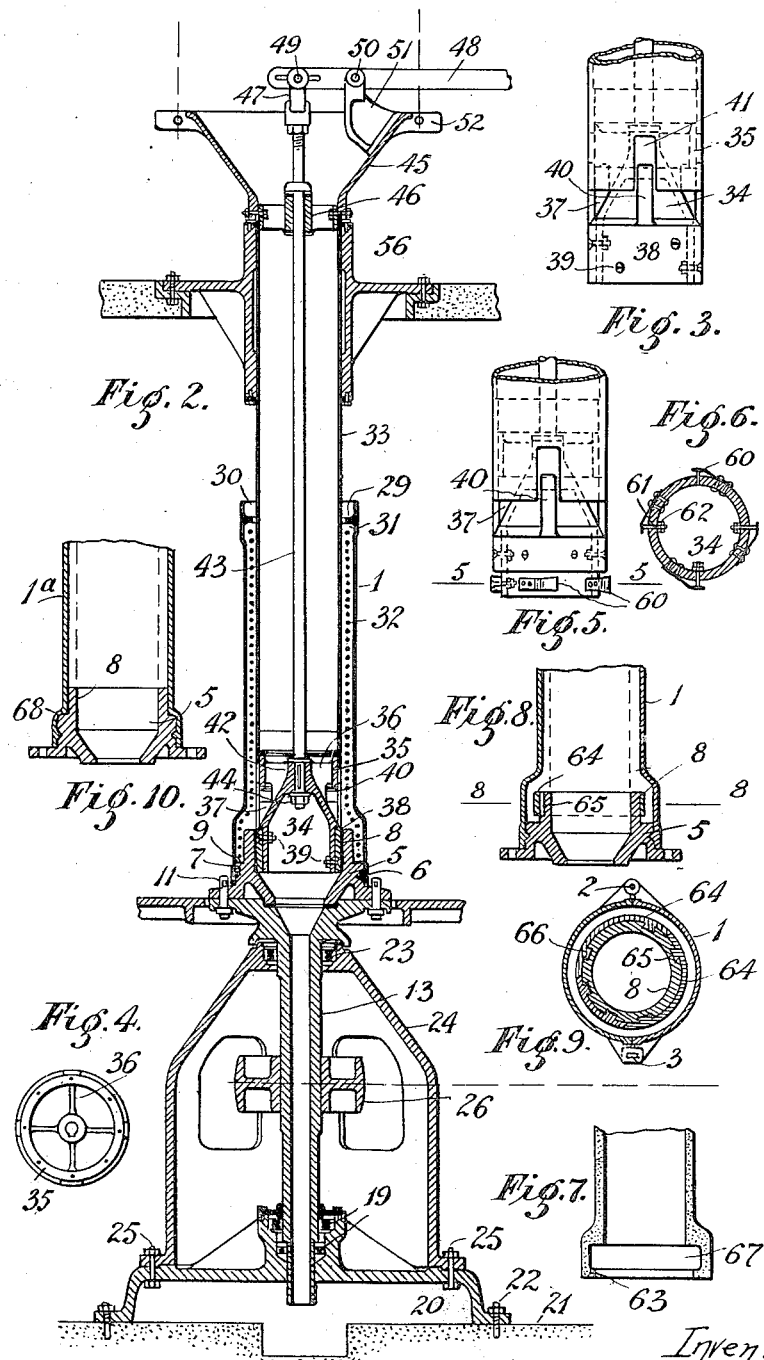

Sept. 25, 1923.  
E. SCOTT  
1,468,749  
CENTRIFUGAL APPARATUS FOR MANUFACTURING CONCRETE PIPES AND LIKE TUBULAR STRUCTURES  
Filed Sept. 11, 1922  
3 Sheets-Sheet 3

Inventor:
Ernest Scott,
by Emil Bonnelycke
Attorney

Patented Sept. 25, 1923.

1,468,749

UNITED STATES PATENT OFFICE.

ERNEST SCOTT, OF SUNSHINE, VICTORIA, AUSTRALIA, ASSIGNOR TO SCOTT AND SON PROPRIETARY LIMITED, OF MELBOURNE, VICTORIA, AUSTRALIA.

CENTRIFUGAL APPARATUS FOR MANUFACTURING CONCRETE PIPES AND LIKE TUBULAR STRUCTURES.

Application filed September 11, 1922. Serial No. 587,478.

*To all whom it may concern:*

Be it known that I, ERNEST SCOTT, a subject of the King of Great Britain and Ireland, of Forrest Street, Sunshine, in the State of Victoria, Commonwealth of Australia, have invented certain new and useful Improvements in and Relating to Centrifugal Apparatus for Manufacturing Concrete Pipes and like Tubular Structures, of which the following is a specification.

The present invention relates specifically to apparatus of that type for moulding concrete tubular bodies in which the plastic material fed to the mould is distributed on the wall of the latter by centrifugal action derived from the rotary movement of the mould.

This method of distributing the material in the mould has long been known, verification of which fact can be obtained by inspection of such publications as, for example, the specifications of British Patents 5978 of 1903: 25528 of 1906: 8490 of 1907: 2935 of 1908 and 29781 of 1909.

Apparatus for imparting rotary movement to the mould about either a horizontal or vertical axis is known and the feed of the material to the mould has been effected by mechanical means through a hollow core or mandril to which retraction movement is imparted progressively with the formation of the tubular body.

The present improvements refer to apparatus including a mould rotatable on a longitudinal vertical axis and having a tubular core for said mould associated with means for progressively withdrawing same from the mould as the tubular body is built up from the bottom of the mould.

According to this invention the tubular core is employed as a container for a predetermined measured quantity of the concrete mixture required for the manufacture of one complete tubular body and also functions as a definite sizing member for the internal diameter of the pipe, and said core is associated with means at its lower end for valvularly controlling the delivery of said material to the mould.

Other structural improvements are embraced by this invention which will be hereinafter described and particularly defined in the claims appended to this specification.

The accompanying drawings depict the practical application of the improvements, and to which reference will now be made.

Figure 2 is a vertical section of the apparatus shown in Figure 1 drawn to a larger scale.

Figure 3 is an enlarged view in elevation of the discharge end of the container and feeder removed from the outer casing functioning as a mould.

Figure 4 is a view in plan of a distributor device.

Figure 5 is a similar view to Figure 3, illustrating the application of an adjustable sizing head to the core end of the container and feeder.

Figure 6 is a horizontal section on line 5—5 of Figure 5.

Figure 7 is a fragmentary view in section of a faucet pipe having an internal flange.

Figure 8 is a view in vertical section showing means employed in the construction of faucet pipes as illustrated by Figure 7.

Figure 9 is a horizontal section on line 8—8 Figure 8.

Figure 10 is a view in vertical section illustrating means employed in the construction of plain pipes.

Figures 1, 17:
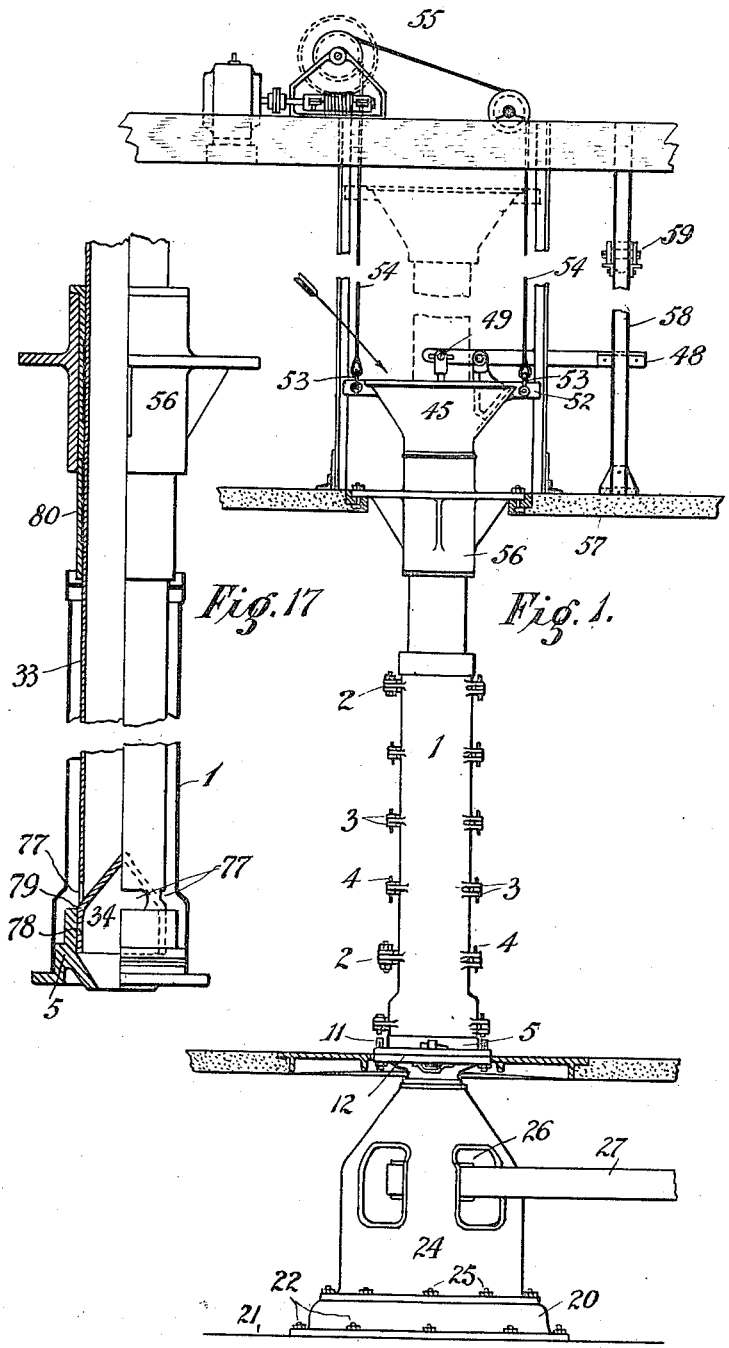
Figure 1 is a side elevation of an apparatus incorporating improvements according to the invention.
Figure 17 is a view partly in section and partly in elevation of a modified construction according to which the distributer is formed integrally with the feeder and container.

In these views 1 designates a metal mould for the manufacture of concrete pipes having faucet ends. This mould may be constructed of sheet metal or of cast metal, and it is preferably formed in two mating sections hingedly connected longitudinally at 2 and having lugs 3 and cotters 4 for locking the mould sections together (see Figure 1) with their adjacent edges in close abutment as seen in Figure 9.

The mould is supported vertically by a metal base 5 from which it is adapted to be readily detached. A V-shaped bead 6 is formed on the inner surface of the lower portion of the mould and fits within a correspondingly shaped circumferential groove 7 on said base. This base is adapted to fit snugly within the lower end of said mould, for which purpose it is formed with an upward annular extension 8 which functions as a core for the formation of the faucet end of the concrete pipe in the manner hereinafter explained. Said base 5 has a shoulder 9 to provide effective support for the concrete mixture delivered to the mould and forming the aforesaid faucet end.

The base 5 supporting the vertically disposed mould has a partially coned central orifice 10, and it is rigidly but detachably mounted by means of cotter bolts 11 upon a horizontally revolvable table 12, preferably constructed of cast metal. This table is either formed integrally with, or is affixed to, the upper end of a hollow vertical and revolvable shaft 13 which registers with the lower end of the coned orifice 10 formed in said base.

Figure 16:
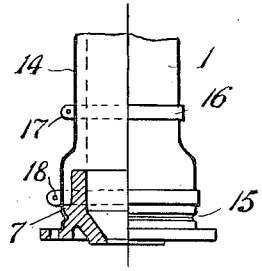
Figure 16 is a view partly in section and partly in elevation of a sheet metal mould sprung into position and maintained vertically on a supporting base.

The mould casing 1 instead of being formed in sections hingedly connected together, may be constructed of sheet spring steel in unitary form having a longitudinal slit 14—see Figure 16—whereby it is adapted to be sprung over the base 5 and maintained by the latter in vertical disposition. The spring metal mould has a V-shaped bead or inward and annular projection 15 adapted to fit snugly within a correspondingly shaped recess 7 formed circumferentially in said base 5. Clamp bands 16 are detachably fitted to said mould casing 1 and have their contiguous ends perforated at 17 to receive securing bolts 18.

In lieu of the clamp bands 16, I may provide apertured lugs on the outer face of the mould adjacent to the meeting edges of the slitted mould portion, and insert bolts through said lugs for the purpose of rigidly maintaining said mould closed upon the base 5. This detail constructional modification, although not illustrated, will be readily understood.

The vertical shaft 13 is mounted at its lower end in ball foot-step bearings 19 formed on a metal bed-plate 20 secured to a foundation 21 by bolts or other fastenings 22. The upper end of said vertical shaft is mounted in a ball-bearing 23 fitted to the upper end of a metal pedestal 24 rigidly mounted on the bed-plate 20 by bolts 25.

A driving pulley 26 is fixed upon the vertical hollow shaft 13 in order that the horizontal table 12 with the base 5 and supported mould 1 can be rotated at a required speed by a belt transmission 27 from a variable speed electric motor or other approved power source.

Formed in the upper portion of the mould 1 is an inward flange 29 acting as a gauge for the thickness at the top or spigot end of the pipe, while that portion 30 of the mould located above said flange provides an annular catchment for any surplus moisture exuded from a concrete pipe at the final stage of its manufacture. An inner circumferential recess 31 is formed immediately beneath said flange 29 to provide for the moulding of a locating bead circumferentially on the spigot end of a manufactured pipe.

32 indicates a metallic reinforcement of approved type which may be inserted within the mould casing 1 and is supported at a suitable distance from the internal surface of said mould by the shoulder 9 formed on the metal base 5.

Vertically slidable within the mould 1 is a cylindrical container and feeder 33, ordinarily constructed of sheet metal, the function of which is to hold a predetermined measured quantity of concrete mixture necessary for the manufacture of one pipe, and in the course of upward slidable movement imparted thereto to automatically discharge its content continuously in a regular flow into the mould to progressively form a pipe in the manner hereinafter more particularly explained.

A distributer element 34 having its upper portion of conical configuration has a guide ring 35 vertically slidable against the inner lower surface of the container and feeder 33 (see Figure 2). Said guide ring is formed integrally with the distributer 34 by radial webs 36. The spaces between these webs permit uninterrupted flow of the concrete mixture from the cylindrical container and feeder 33 through the annular space 37 between the lower end of said container and the coned upper portion of said distributer 34.

The container 33 and the distributer 34 are of approximately the same diameter, otherwise the progressive manufacture of the concrete pipe cannot be effected consistent with the efficiency of the product when the mould is rotated at a required high speed.

A wearing liner 38 is detachably fitted by bolts 39 exteriorly of the lower end of the distributer 34, and it is constructed having a series of equidistantly spaced vertical bridging bars 40 (see Figures 3 and 5) fitting snugly and slidably within said guide slots 41 formed in the lower end of the container and feeder 33. Said liner 38 affixed exteriorly of the lower portion of the distributer 34 functions as a core for the manufacture of a pipe during the progressive vertical slidable movement of said container and feeder 33, while said bridging bars, during the rotation of the mould, serve to prevent accumulation of concrete mixture about the annular space 37. The distributer 34 has a centrally disposed and apertured boss 42 through which is passed the lower threaded end of a vertical spindle 43 which is secured thereto by a nut 44. A feed funnel 45 is secured to the upper end of the container and feeder 33, and it has secured within its lower portion a bearing 46 to slidably support the upper end of the spindle 43. A jaw 47 affixed adjustably on the upper extremity of said spindle receives the slotted end of a lever 48 which is retained in position by a pin 49. Said lever is pivoted at 50 to a bracket 51 secured to said feed funnel 45.

Oppositely positioned and apertured lugs 52 are formed on said funnel and receive shackles or like connections 53 of haulage ropes 54 of a hoisting winch 55, which may be electrically or otherwise driven.

A guide 56 for the slidable concrete container and feeder 33 is mounted in the flooring 57 of a concrete mixing chamber, while a fixed vertical guide 58 is erected in said mixing chamber and accommodates a slidable weight 59 adapted to contact with the free end of the pivoted lever 48 when said container and feeder 33 has been elevated to the extreme limit of its upward travel and the manufacture of a pipe has been completed.

Pivotal movement thus imparted to the lever 48 elevates the distributer 34 so as to close the annular discharge space 37 and thereby function as an automatic cut-off to prevent any surplus concrete mixture, if any, and which may have adhered to the inner surface of the concrete container and feeder 33 from entering the manufactured pipe.

An adjustable sizing head may be provided at the lower end of the distributer 34 as is illustrated in Figures 5 and 6, and it comprises a series of equidistantly spaced flat metal spring members 60 riveted at one end to the outer surface of said distributer and having their free ends fastened to the outer ends of bolts 61 passed through the wall of the distributer. These bolts are readily adjustable by nuts 62 to move said spring members either inwardly or outwardly, as may be required, to increase the diametral bore of the concrete pipe beyond the diameter of bore initially effected by the core distributer 34, and to automatically smooth its inner surface, the free ends of said members being in the direction of rotation of the mould.

For the manufacture of a concrete pipe of a type having its faucet furnished with an internal flange as 63—see Figure 7—the metal base 5 has its extension 8 fitted with a detachable circular band 64 formed in a plurality of segments—and provided with dovetail projections 65 to fit in similarly-shaped recesses 66 in said extension 8, as illustrated in Figures 8 and 9. Said extension 8, with attached band 64, functions as a core to form the annular chamber 67 in the faucet end of the pipe and the internal flange 63. Upon removal of the concrete pipe vertically from the base 5, the flange 63 by contacting with the lower edge of the band segments 64 effects the disengagement of the latter from said base.

For the manufacture of a plain concrete pipe, that is to say, a pipe not having a faucet end, I provide a mould and base as illustrated by Figure 10. The base 5 has a curved shoulder 68 to support the lower portion of the mould 1ª which is of corresponding configuration, while the upward extension 8 of said base fits snugly within the mould.

Figure 11:
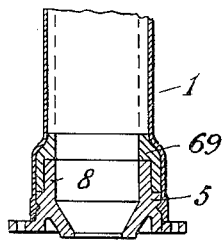
Figure 11 is a view in vertical section illustrating means whereby the mould shown in Figures 1 and 2 for the construction of faucet pipes is usable for the manufacture of plain pipes.

Plain concrete pipes can be manufactured by the use of the mould 1 and base 5 seen in Figure 2 by the means illustrated in Figure 11, wherein a metal filling piece 69 of annular design is fitted around and is supported by the extension 8 so as to fit snugly within the lower end of the mould 1. The upper edge of said filling piece provides a support for the concrete mixture delivered to said mould by the distributer 34 fitted to the container and feeder 33.

Figure 12:
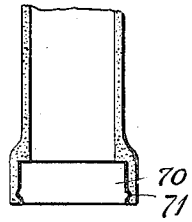
Figure 12 is a fragmentary view in vertical section of a pipe having a metallic band moulded in its faucet end.
Figure 13:
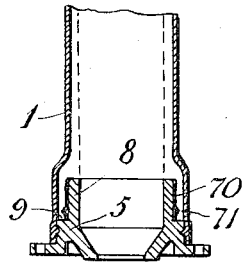
Figure 13 is a view in vertical section illustrating means employed in the construction of the pipe shown by Figure 12.

Figure 12 illustrates a concrete pipe having a metallic band 70 moulded into its faucet end to aid in the formation of a water-tight joint between two pipe sections, and also functioning as a reinforcement for the faucet end of said pipe. In the manufacture of this type of concrete pipe, said metallic band 70, which has a peripheral binding bead 71, is slipped over the base extension 8 and is loosely supported by the shoulder 9—see Figure 13—so that it will be moulded into the faucet end of the concrete pipe.

Figure 14:
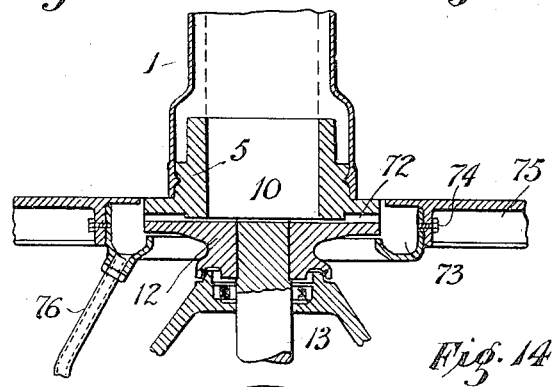
Figure 14 is a view in vertical section, drawn to a larger scale than the other views, illustrating modified means for the discharge of surplus moisture from the mould during the manufacture of pipes.
Figure 15:
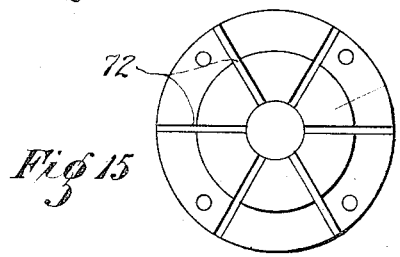
Figure 15 is a plan view of the revolvable table embodied in the modified construction illustrated by Figure 14.

According to the modification illustrated by Figures 14 and 15, the revolvable horizontal table 12 is fixedly secured to the upper end of a solid vertical shaft 13. Surplus moisture exuded from the concrete mixture during the manufacture of a pipe passes through the orifice 10 in the metal base 5 onto the revolvable table 12, and is discharged therefrom by means of radially arranged channels 72 formed in the upper surface of said table. These channels deliver into an annular shaped trough 73 detachably secured by studs 74 to a metal frame 75, and furnished with a discharge pipe 76.

According to the modification illustrated in Figure 17, the distributer 34 is constructed integrally with the container and feeder 33 and the wearing liner 38 may be dispensed with. Openings 77 for the discharge of concrete mixture into the mould are formed in said feeder and container above its core member 78. This core member has a shoulder 79 and a sleeve 80 is secured in the vertical guide 56 and adjustable according to the length of pipe to be manufactured. When the feeder and container 33 has been elevated to a sufficient degree for the complete manufacture of a pipe in vertical progressive manner, the shoulder 79 contacts with the lower end of the sleeve 80, and the latter is then in a position to completely enclose the discharge openings 77 so as to thereby prevent any surplus concrete mixture, which may be in the feeder and container, from entering into the now completely manufactured pipe or tubular article.

In action, the mould 1 is placed in vertical position on the supporting base 5, with or without the metal reinforcement 32. The container and feeder 33 is lowered into the mould until it is in the position illustrated in Figure 2. Rotary motion is imparted to the table 12, base 5 and supported mould 1, when a predetermined measured quantity of concrete mixture is delivered into the container and feeder 33 through the funnel 45.

The concrete mixture so delivered descends by gravity and passes between the webs 36 onto the conical portion of the distributer 34, whence it is directed into the lower end of the mould designed for the formation of the faucet end of the pipe. The hoisting winch 55 having been set in motion the container and feeder 33 is progressively raised at a predetermined rate of travel, permitting the concrete mixture to flow by gravity continuously through the discharge opening 37 between the distributer 34 and the lower end of the container and feeder 33. Centrifugal force imparted to the concrete mixture within the mould 1 causes it to be packed tightly against the inner surface of said mould, and simultaneously internal force is applied to the mixture by the wearing liner 8 affixed to the lower end of the distributer 34, which in its upward movement with the container and feeder 33 functions as a core determining the diametral bore of the concrete pipe in the course of manufacture. When the container and feeder 33 has been elevated to a sufficient degree for the progressive and complete manufacture of a concrete pipe of required length (such length being determined by the mould used) by centrifugal action and the internal force applied by said core, the free end of the pivoted lever 48 contacts with the slidable weight 59 and imparts pivotal movement to said lever which raises the distributer 34—independently of the container and feeder 33—thereby causing its lower end to contact with the lower end of said container and feeder so as to close the discharge opening 37 and prevent any surplus concrete material (if any) from entering the manufactured pipe.

When there is employed a distributer 34 fitted with a sizing head comprising adjustable spring members as 60, the required internal diameter of the concrete pipe being manufactured can be accurately determined by adjustment of said spring members conveniently effected by manipulation of the nuts 62 of the radially arranged bolts 61.

Surplus moisture exuded from the concrete mixture, during the progressive formation of the pipe, descends through the central orifice 10 in the base 5 and thence through the tubular shaft 13, but according to the modified arrangement illustrated in Figures 14 and 15, such moisture is delivered into channels 72 formed radially on the upper surface of the table 12, from which it is discharged into the annular trough 73 to be subsequently drawn off by the pipe 76.

The container and feeder 33 having been raised above the mould 1, the manufactured pipe may be conveniently released from the base 5 and said mould by the removal of the cotter pins 4 fitted in the lugs 3 when the mould sections can be opened on their hinges 2. If desired, the base 5, mould 1 and contained concrete pipe can be removed bodily from the table 12 merely by releasing the cotter bolts 11.

The action of the modified apparatus illustrated in Figure 17 of the drawings will be clear aided by the description thereof as hereinbefore set forth. The mechanical integers which are employed for automatically effecting a closure of the annular discharge opening 37 in the construction illustrated more particularly in Figure 2, and comprising the vertical rod 43, pivoted lever 48 and balance weight 59 are not required in this modified construction of apparatus, due to the use of a distributer 34 which is formed on or affixed to the container and feeder 33 and the use of the adjustable cut-off sleeve 80 which effects a closure of the discharge openings 77 in said feeder and container at that stage when the pipe has been completely manufactured.

What I do claim is:

1. In apparatus for making concrete pipe, the combination of a vertical mould and means for permanently supporting it against endwise movement, a hollow container and feed device for the concrete mixture consisting of a tubular body longituinally slidable within the vertical mould and provided at its lower end with a distributer element acting as a core to apply internal pressure to the concrete during the progressive vertical manufacture of the pipe and with a discharge opening directly adjacent the distributer, said container and core distributer being of approximately equal diameter, substantially as described.

2. In apparatus of the type specified, a hollow container and feed device as set forth in claim 1, and an adjustable sizing head at the lower end of the distributer for increasing the diameter of the bore of the pipe beyond the diameter initially formed by the core distributer during the progressive manufacture of such pipe, substantially as described.

3. In apparatus of the type specified, a hollow container and feed device as set forth in claim 1, and in which the distributer element is provided with valvular cut-off means operating automatically when the vertical progressive manufacture of the pipe is completed, substantially as described.

4. In apparatus of the type specified, a hollow container and feed device as set forth in claim 1, and wherein the upper portion of the distributer element is of conical configuration and has a guide ring vertically slidable against the inner lower surface of the container and feeder, said guide ring being formed integrally with the distributer by radial webs, the spaces between which permit ready flow of concrete mixture to the coned outer surface of the distributer and thence to the mould, substantially as described.

5. In apparatus of the type specified, a hollow container and feed device as set forth in claim 1, and wherein the distributer element is fixedly mounted at the lower end of the container and feed device, discharge openings being formed in said container and feed device, and a cut-off sleeve encircling said container and feed device, substantially as described.

6. In apparatus of the type specified, a hollow container and feed device as set forth in claim 1, and having vertical bridging bars on the distributer element slidably fitting in slots formed in the lower end of the container and feed device, substantially as described.

7. In apparatus of the type specified, a hollow container and feed device as set forth in claim 6, and wherein a wearing liner is fitted to the distributer element and the bridging bars are constructed integrally with said liner, substantially as described.

8. In apparatus of the type specified, a hollow container and feed device as set forth in claim 1, and having vertical bridging bars on the distributer element slidably fitting in slots formed in the lower end of the container and feed device, and an adjustable sizing head on said distributer element, substantially as described.

9. In apparatus of the type specified, a hollow container and feed device as set forth in claim 1, and having a wearing liner fitted to the distributer element, bridging bars carried by the liner slidably fitting in slots formed in the lower end of the container and feed device, and an adjustable sizing head on said distributer element, said sizing head comprising a series of members fixed at one end and having their free ends expansible and contractible by radially adjustable bolts, substantially as described.

10. In apparatus of the type specified, a hollow container and feed device as set forth in claim 1, in combination with a tubular base fitted to a horizontally revolvable table, said base detachably supporting the mould and forming an interlocking engagement therewith, substantially as described.

11. In apparatus of the type specified, a hollow container and feed device as set forth in claim 1, in combination with means for progressively elevating said container and feed device with attached distributer, and means for automatically imparting to the distributer element of said device a limited upward movement independently of the container upon the completion of manufacture of the pipe, substantially as described.

12. Apparatus according to claim 10, wherein the mould is constructed in unitary form of sheet spring metal having a longitudinal slit adapting it to be sprung over the metal mould supporting base fitted to the horizontal table, and wherein clamping means are provided to maintain said mould in vertical position on said base, substantially as described.

13. Apparatus according to claim 10, wherein the horizontal table is located on a vertical hollow shaft, the bore of which registers with the discharge orifice in said base, and wherein a driving element is mounted on said shaft, substantially as described.

14. Apparatus according to claim 10, wherein the revolvable table is mounted on a solid vertical shaft and has channels on its upper face for the delivery of moisture to a chamber which is adjacent to said table and furnished with a draw-off pipe, substantially as described.

15. Apparatus according to claim 10, wherein the tubular base has an upward annular extension functioning as a core for the formation of the faucet end of the pipe, and wherein a shoulder is formed on said base to support the concrete mixture initially delivered to the mould, substantially as described.

16. Apparatus according to claim 10, wherein the mould has an inward flange adjacent to its upper end functioning as a thickness gauge, an annular catchment for moisture above said flange, and a circumferential recess beneath said flange, substantially as and for the purposes set forth.

17. In apparatus of the type specified, a hollow container and feed device as set forth in claim 1 in combination with a hoisting winch, a funnel, a lever pivoted above said funnel, a vertical spindle having its lower end secured to the distributer and its upper end to said lever, lugs on said funnel receiving the connections of haulage ropes of said winch, a vertical guide, and a slidable weight on said guide adapted to contact with the free end of said lever when the container and feeder has been elevated to a predetermined degree following the completion of manufacture of a pipe and thereby further elevate the distributer, substantially as and for the purposes set forth.

18. In apparatus of the type specified, the improvements according to claim 10, wherein the base has an upward annular extension functioning as a core for the formation of the faucet end of the pipe, and a shoulder formed on said base to support the concrete mixture initially delivered to the mould, and wherein said extension is fitted with a detachable circular band formed of a plurality of segments, and dove-tail jointing members are provided on said segments and on said base, substantially as and for the purposes set forth.

19. In apparatus for making a concrete pipe or tubular body by centrifugal action, the combination, with a vertical mould, of a hollow container and feed device for the concrete material disposed within the mould, a base whereon the mould is supported at its lower end having an upstanding annular extension which is spaced from the inner surface of the mould wall to provide an annular chamber therebetween, and an annular filling piece supported upon the top of said extension and having a portion which fits in said recess to form a pipe having a plain lower end, said filling piece being detachable from said extension to leave said chamber empty to receive concrete material and thereby form a faucet-shaped end on the pipe; substantially as described.

20. In apparatus for making a concrete pipe or tubular body by centrifugal action, the combination, with a vertical mould, of a hollow container and feed device for the concrete material disposed within the mould, a base whereon the mould is supported at its lower end having an upstanding annular extension which is spaced from the inner surface of the mould wall to provide an annular chamber therebetween for the reception of concrete material to form a faucet-shaped end on the pipe, and a metallic band loosely encircling said extension and having a peripheral binding bead, said band adapted to be moulded into said faucet end; substantially as described.

21. In apparatus for making a concrete pipe or tubular body by centrifugal action, the combination with a mould rotatable in a set position about a longitudinal vertical axis, of a hollow container and feed device for the concrete mixture consisting of a tubular body longitudinally slidable within the vertical mould and provided at its lower end with a distributer element, said tubular body and distributer acting as a core to determine the internal diameter of the pipe during the progressive vertical feed of the concrete mixture, and said container having a discharge opening directly adjacent the distributer, said container and distributer being of approximately equal diameter; substantially as described.

In testimony whereof I affix my signature in the presence of two witnesses.

ERNEST SCOTT.

Witnesses:
 A. J. CALLINAN,
 I. MARSHALL.